US008483703B2

(12) United States Patent
Swope et al.

(10) Patent No.: US 8,483,703 B2
(45) Date of Patent: Jul. 9, 2013

(54) METHOD AND APPARATUS FOR LOCATING A TRANSCEIVER

(75) Inventors: Charles B. Swope, Coral Springs, FL (US); Armando J. Gonzalez, Miami, FL (US); Richard S. Young, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1249 days.

(21) Appl. No.: 11/273,420

(22) Filed: Nov. 14, 2005

(65) Prior Publication Data

US 2007/0111737 A1    May 17, 2007

(51) Int. Cl.
*H04W 24/00*    (2009.01)

(52) U.S. Cl.
USPC ..................................... 455/456.1; 455/456.5

(58) Field of Classification Search
USPC ..................... 455/456.1–456.6, 513, 517, 524
See application file for complete search history.

(56) References Cited

U.S. PATENT DOCUMENTS

| | | | |
|---|---|---|---|
| 4,129,868 A | 12/1978 | Tahara et al. | |
| 4,823,295 A | 4/1989 | Mader | |
| 5,022,046 A | 6/1991 | Morrow, Jr. | |
| 5,175,729 A | 12/1992 | Borras | |
| 5,550,549 A | 8/1996 | Procter, Jr. et al. | |
| 5,687,196 A | 11/1997 | Proctor, Jr. et al. | |
| 5,719,584 A | 2/1998 | Otto | |
| 5,859,613 A | 1/1999 | Otto | |
| 5,870,029 A | 2/1999 | Otto et al. | |
| 5,960,047 A | 9/1999 | Proctor, Jr. et al. | |
| 5,982,808 A | 11/1999 | Otto | |
| 6,021,330 A * | 2/2000 | Vannucci | 455/456.2 |
| 6,038,271 A | 3/2000 | Olaker et al. | |
| 6,067,017 A | 5/2000 | Stewart et al. | |
| 6,243,588 B1 | 6/2001 | Koorapaty et al. | |
| 6,324,392 B1 | 11/2001 | Holt | |
| 6,476,681 B1 | 11/2002 | Kirkpatrick | |
| 6,549,562 B1 | 4/2003 | Olaker et al. | |
| 6,611,758 B1 | 8/2003 | Nysen | |
| 6,677,895 B1 * | 1/2004 | Holt | 342/357.1 |
| 6,937,679 B2 | 8/2005 | Skinner | |
| 6,972,719 B1 | 12/2005 | Swipe et al. | |
| 7,068,704 B1 | 6/2006 | Orr | |
| 7,177,910 B1 | 2/2007 | Bell | |
| 7,215,167 B1 | 5/2007 | Hassun | |
| 7,298,809 B2 | 11/2007 | Cranin | |
| 7,330,883 B1 * | 2/2008 | Jessup et al. | 709/224 |
| 2002/0118655 A1 * | 8/2002 | Harrington et al. | 370/328 |
| 2003/0133496 A1 * | 7/2003 | Hooton | 375/139 |

(Continued)

OTHER PUBLICATIONS

Notice of Allowance mailed Dec. 1, 2011 for related U.S. Appl. No. 12/335,156, Armando J. Gonzalez, filed Dec. 15, 2008.

(Continued)

*Primary Examiner* — Brandon Miller
(74) *Attorney, Agent, or Firm* — Barbara R. Doutre

(57) ABSTRACT

A radio system for locating a radio transceiver configured to exchange voice or data with a plurality of base stations on a narrowband channel is described. The system includes the radio transceiver that exchanges voice or data on the narrowband channel with a base station of the plurality of base stations and also to periodically transmit a chirp signal to the plurality of base stations. The radio system also includes the plurality of base stations each with a matched filter configured to receive the periodically transmitted chirp signal and to triangulate a location of the radio transceiver using the received chirp signal.

26 Claims, 4 Drawing Sheets

U.S. PATENT DOCUMENTS

| | | | | |
|---|---|---|---|---|
| 2003/0156063 | A1* | 8/2003 | Spilker et al. | 342/464 |
| 2005/0046607 | A1* | 3/2005 | Volman | 342/109 |
| 2005/0228613 | A1* | 10/2005 | Fullerton et al. | 702/150 |
| 2005/0242896 | A1* | 11/2005 | Rohde et al. | 331/179 |
| 2006/0092865 | A1* | 5/2006 | Williams | 370/310 |
| 2007/0080852 | A1 | 4/2007 | Blumke et al. | |
| 2008/0224895 | A1 | 9/2008 | Krishna et al. | |

OTHER PUBLICATIONS

Non Final Office Action mailed Aug. 15, 2011 for related U.S. Appl. No. 12/335,156, Armando J. Gonzalez, filed Dec. 15, 2008.

International Search Report & Written Opinion for related counterpart International Application No. PCT/US2009/067086 mailed on Jul. 14, 2010.

International Preliminary Report on Patentability for related counterpart International Application No. PCT/US2009/067086 dated Jun. 21, 2011.

Notice of Allowance mailed Aug. 2, 2011, for related U.S. Appl. No. 12/335,091, Charles R. Ruelke, filed Dec. 15, 2008.

Non Final Office Action mailed Mar. 30, 2011, for related U.S. Appl. No. 12/335,091, Charles R. Ruelke, filed Dec. 15, 2008.

International Search Report and Written Opinion for related counterpart International Application No. PCT/US2009/067085 mailed Jul. 14, 2010.

International Preliminary Report on Patentability for related counterpart International Application No. PCT/US2009/067085 mailed on Jun. 30, 2011.

Springer, A. et al., "Spread Spectrum Communications Using Chirp Signals," pp. 1-6.

* cited by examiner

METHOD AND APPARATUS FOR LOCATING A TRANSCEIVER

FIELD OF THE INVENTION

The field of the invention relates to portable communication devices and more particularly to methods of locating portable communication devices.

BACKGROUND

Portable radios vastly improve the effectiveness of police, fire and military personnel. During a public or military emergency, often the first personnel on-site can avert tragedy and can direct subsequent personnel as to how to best respond to the exigencies of the situation.

However, the first personnel on-site can become injured by unstable situations. For example, during a fire, firemen can become lost in smoke filled buildings while looking for fire victims. If not found, fireman can become overcome by the smoke with fatal results.

Similarly, in covert operations by the military, hostile fire can incapacitate personnel during an initial or unintended contact with hostile forces. If incapacitated personnel cannot be quickly located, the result, again, can be fatal.

In general, methods of locating personnel (via their transceiver) are known. For example, cellular base stations typically hand off cell phones among base stations based upon a received signal strength indication (RSSI). In such cases, RSSI is assumed to be a measure of distance from the base station. By knowing the distance from the base station, a controller of the base stations may determine a location of the cell phone to within a few hundred feet.

On the other hand, where the transceiver is carried by a fireman within a building, the determination of location within a few hundred feet may not be sufficiently accurate, especially where the entire building may only be a few hundred feet on a side. Accordingly, a need exists for a method of locating public service or military radios that is more accurate than prior methods.

DETAILED DESCRIPTION

Figure 1:
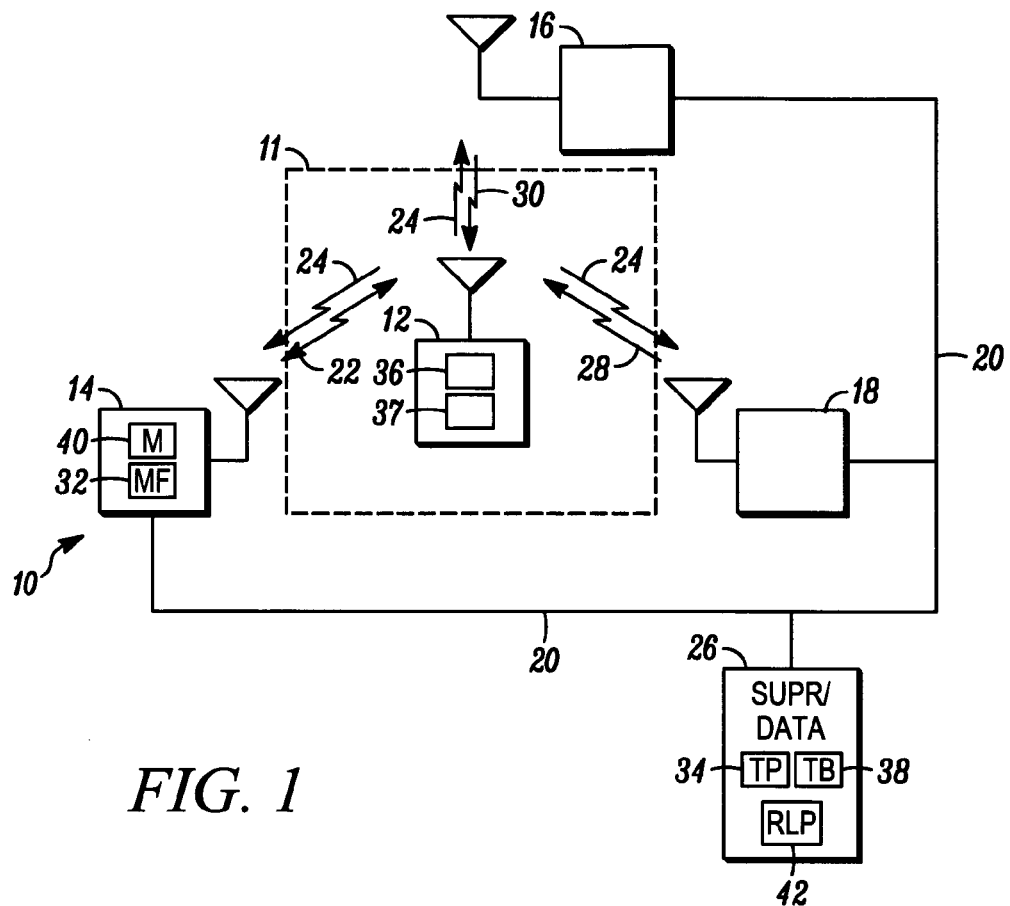
FIG. 1 is a block diagram of a system in accordance with an illustrated embodiment of the invention.

FIG. 1 depicts a system 10 for accurately locating a transceiver 12 in accordance with an illustrated embodiment of the invention. Under one illustrated embodiment, a signal (that in the past has been suppressed) is used as a locator signal that is accurate to within a few meters.

Many radios today use frequency synthesizers. Frequency selection in a frequency synthesizer may be accomplished via a control signal that may be either analog or digital. When the control signal (as a voltage source) is applied to a voltage Controlled Oscillator (VCO) (or is changed), the VCO moves from a first frequency to the programmed frequency. However the frequency change is not immediate and, in fact, occurs over a short period of time creating what is commonly referred to as chirp. As used herein, a chirp signal is an RF signal with a ramped frequency of relatively short duration (e.g., 22 microseconds). In one embodiment, the VCO is termed a broadband VCO since it can be tuned over an RF bandwidth large enough to generate the chirp signal described herein.

In the past, spurious emissions outside of an assigned frequency range have been suppressed. Chirp caused by frequency change of a frequency synthesizer was one of the signals that conventional wisdom taught should be suppressed.

However, it has occurred to the inventors of the instant application that chirp could also be used as a frequency locator signal if used in the proper manner. For example, a radio that would otherwise operate on a conventional narrowband channel (e.g., Frequency Modulation (FM)) can also be used to generate a chirp signal as a locator beacon. As used herein, a narrowband channel is any channel that is not a spread spectrum channel.

It should be noted in this regard that since a chirp signal may be generated across a number of frequency bands, the chirp signal could be thought of as a spread spectrum signal. However, spread spectrum signals operate in frequency bands that are assigned for such purpose and therefore the chirp signal discussed herein is not a conventional spread spectrum signal.

Returning now to FIG. 1, transceiver 12 is a portable device that may be carried by public service or military personnel or covert operators. Available in the area of the transceiver 12 are a number of base stations 14, 16, 18.

The base stations 14, 16, 18 may be interconnected via a hardwired connection 20 or via telemetry. It may also be noted that the base stations 14, 16, 18 may be fixed or mobile (e.g. a portable base station). For example, one or more of the base stations 14, 16, 18 may be a radio frequency repeater located in a police squad car.

During normal operation, the transceiver 12 may exchange a narrowband voice and/or data signal (e.g., FM) 22 with a base station 14. In accordance with some embodiments, the transceiver 12 exchanges voice and/or data signal with the base station 14 on a narrow band channel comprising a simplex channel. The voice and/or data signal 22 may be exchanged with supervisory personnel located a supervisory terminal 26 or with a database within the supervisory terminal 26.

In addition to exchanging the voice and/or data signal or in place of the voice and/or data signal 22, the transceiver 12 may also transmit a chirp signal 24. The chirp 24 may be transmitted under a time base provided from within the transceiver 12 or the chirp 24 may be transmitted in response to a synchronization signal 28 from one of the base stations 14, 16, 18. In addition, the transceiver 12 may be remotely controlled to transmit or not transmit the chirp signals 24 via a control command 30 transmitted from one of the base stations 14, 16, 18.

The chirp 24 may be generated in any of a number of different frequency bands. For example, the VHF, UHF and 700/800 MHz frequency bands have been found to be especially effective for multi-path mitigation. In this regard, different materials used in building construction have radio frequency (RF) attenuation and reflection characteristics that vary with frequency. The use of a low-bandwidth chirp has been found to work, but at reduced accuracy due to degradations in signal reception due to attenuations (i.e., caused by absorption) and reflections (i.e., caused by multi-path propagation). Introducing frequency diversity across bands has been found to reduce the interference and absorption effects and to increase accuracy. In one particular embodiment, a chirp 24 having a frequency range greater than 10 MHz (e.g., 15 MHz) and a duration of less than 100 microseconds (e.g., 22 microseconds) has been found to be particularly effective.

In general, the chirp signal 24 is generated within a function (chirp) generator 37. The chirp 24 may be represented by Eqn. 1.0 below where f is the carrier (or IF) frequency, k is the chirp slope and the function represents the pulse shape of the signal.

$$rec()s_1(t) = rect\left(\frac{1}{T}\right)e^{j2\pi(ft+Kt^2/2)} \quad 1.0$$

Figure 2:
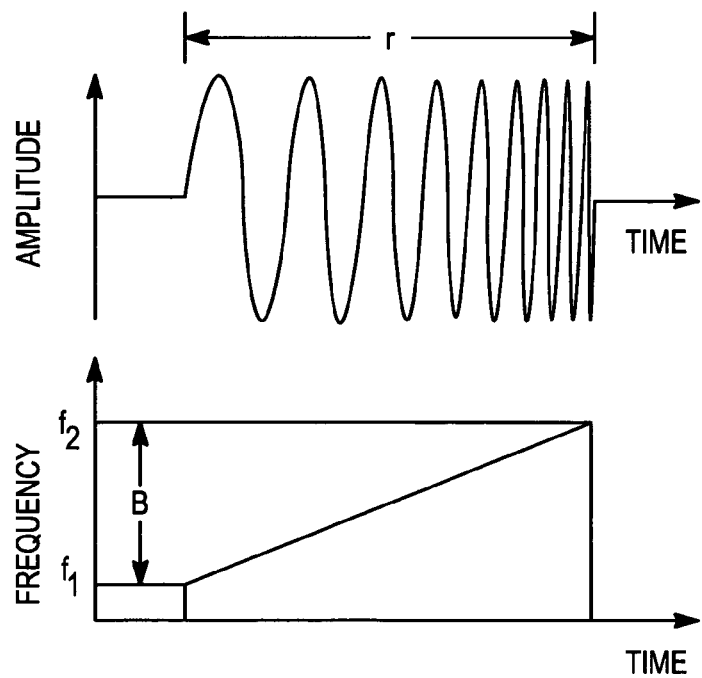
FIG. 2 depicts a chirp signal and a chirp control signal that may be used by the system of FIG. 1.

FIG. 2 represents a waveform and control voltage for the chirp of Eqn. 1.0.

The chirp signals 24 may be detected within a matched filter 32. Distance from each base station 14, 16, 18 may be determined by a difference in time of arrival of the chirp 24 at each base station 14, 16, 18. The actual location of the transceiver 12 is then determined by triangulation within a triangulation processor 34.

The response of the matched filter 32 may be as shown in Eqn. 1.1, where delta (Δ) represents the FM change in frequency within the pulse and D is the time-bandwidth (B*T of FIG. 2).

$$so(t) := \sqrt{D} \cdot 1j \cdot \left(\frac{\sin(\pi\Delta \cdot t)}{\pi\Delta \cdot t}\right) e^{\left[1j \cdot 2\pi\left[f \cdot t \frac{(k \cdot t^2)}{2}\right]\right]} \quad 1.1$$

The complex signal can be represented in more standard form by breaking down the exponential function into its sine and cosine functions. Eqn. 1.2 is a more familiar form with the exception of the complex number in front of the cosine function.

$$so(t) := -D^{\frac{1}{2}} \cdot \sin(\pi \cdot \Delta \cdot t) \cdot \frac{-i \cdot \cos(2 \cdot \pi \cdot f \cdot t - \pi \cdot k \cdot t^2) + \sin(2 \cdot \pi \cdot f \cdot t - \pi \cdot k \cdot t^2)}{\pi \cdot \Delta \cdot t} \quad 1.2$$

By adding a quarter wave phase shift and taking the real part of Eqn. 1.2, Eqn. 1.2 can be converted to the form of Eqn. 1.4.

$$Rso(t) := -\sqrt{D} \cdot \frac{\sin(\pi\Delta \cdot t)}{\pi\Delta \cdot t} \cdot \sin(2 \cdot \pi \cdot f \cdot t - \pi \cdot k \cdot t^2) \quad 1.3$$

$$Rso\_alt(t) := \sqrt{D} \cdot \frac{\sin(\pi\Delta \cdot t)}{\pi\Delta \cdot t} \cdot \cos\left(2 \cdot \pi \cdot f \cdot t - \pi \cdot k \cdot t^2 + \frac{\pi}{4}\right) \quad 1.4$$

Figure 3:
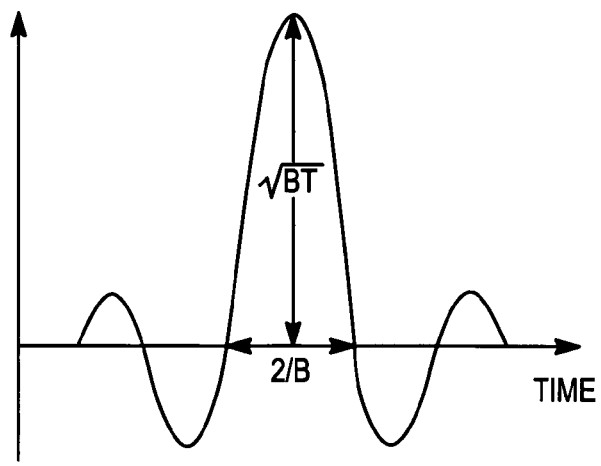
FIG. 3 depicts a response of a matched filter to the chirp signal produced by the transceiver of FIG. 1.

The power response of Eqn. 1.4 is determined by taking the square of the real voltage and plotting it. FIG. 3 illustrates the compressed (matched) filter response. FIG. 3 illustrates that a radio having the ability to do compression can be used to do other things, such as location detection provided the timing of receipt of the chirp can be detected. The method of receive detection can vary from receiver to receiver. Under one illustrated embodiment, edge trigger detection may be used.

Figure 4:
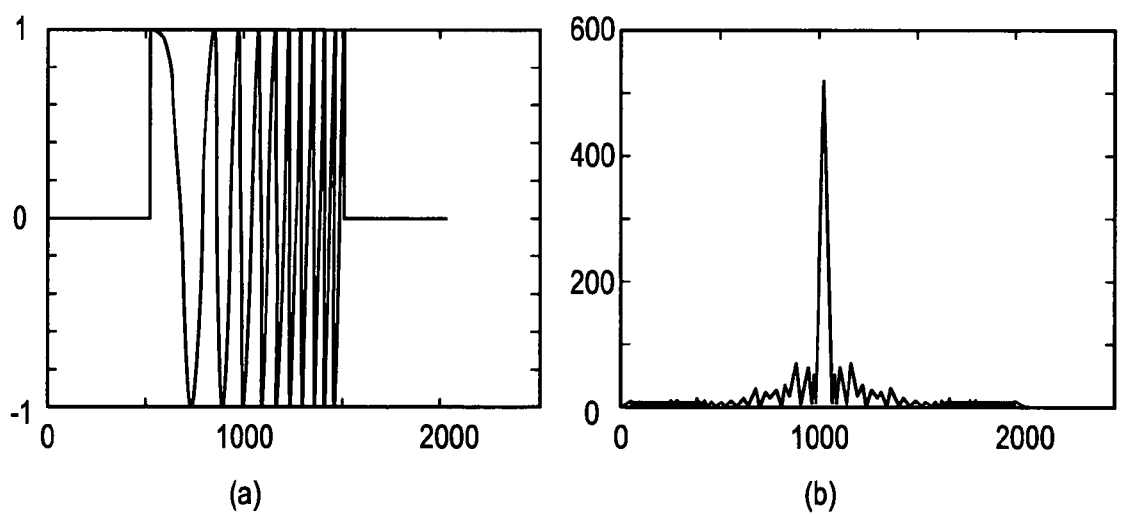
FIG. 4 depicts a time line example of the chirp signal provided by the transceiver of FIG. 1.

FIG. 4 represents a time line example of the two signals of FIGS. 2 and 3 using the same time axis and illustrates the time compression that occurs. Additional side lobe suppression can also occur with some minor consequences, including a slight degradation in accuracy.

Any of a number of different hardware architectures may be used within the transceiver 12 to transmit both the narrow band voice and/or data signal and also the chirp signal (e.g., the Motorola Tomahawk IC in a multi-band frequency generation unit (FGU)). The Motorola Tomahawk IC (FIG. 5) has a narrow band capability of providing four-level, frequency shift keying modulation (C4FM). The use of a chip set designed for narrow band application to also generate a locating signal is believed unique. Thus, in one embodiment, the transceiver 12 implements a narrowband architecture as described herein.

Figure 5:
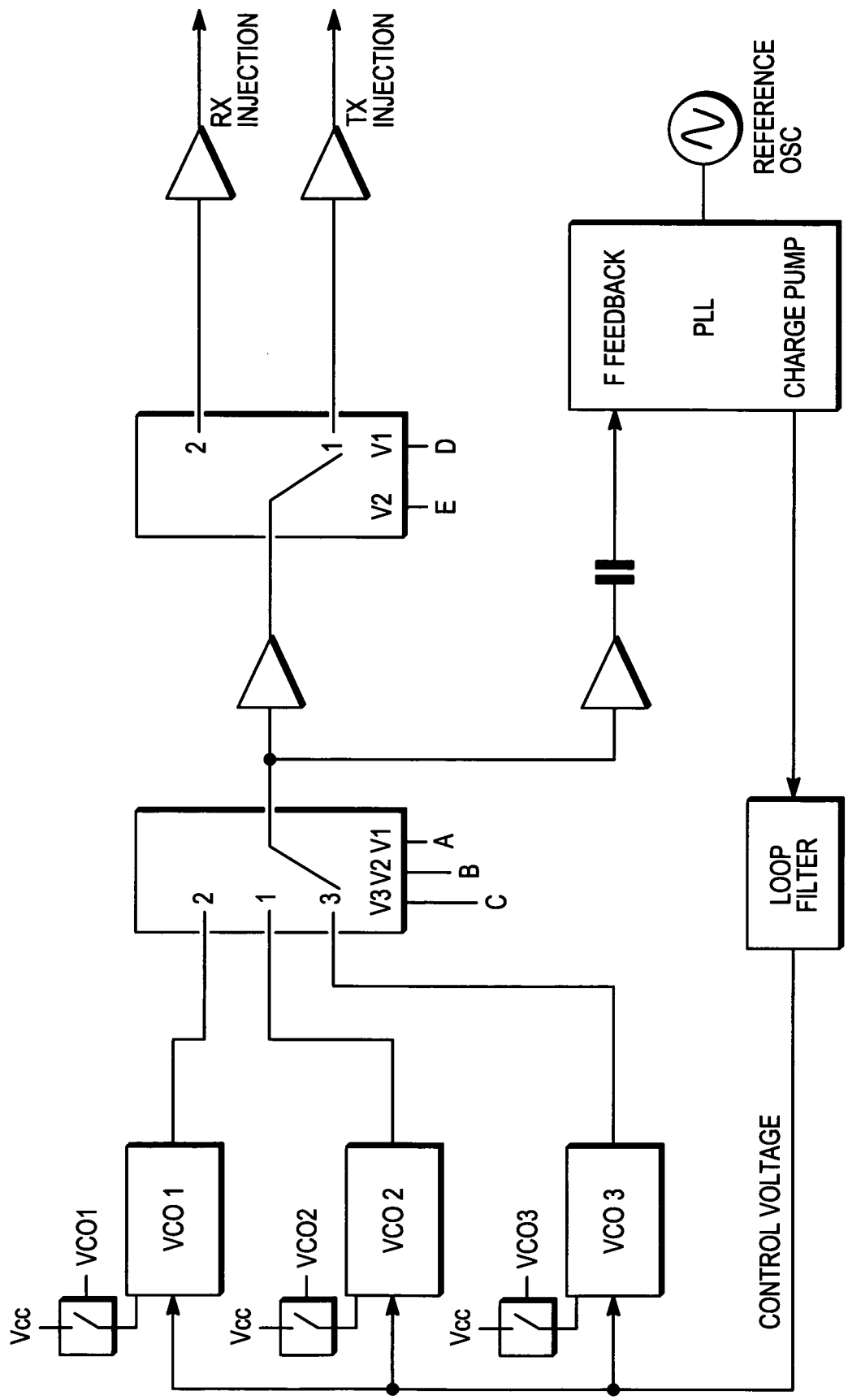
FIG. 5 depicts a chirp generator function used by the system of FIG. 1.
Figure 6:
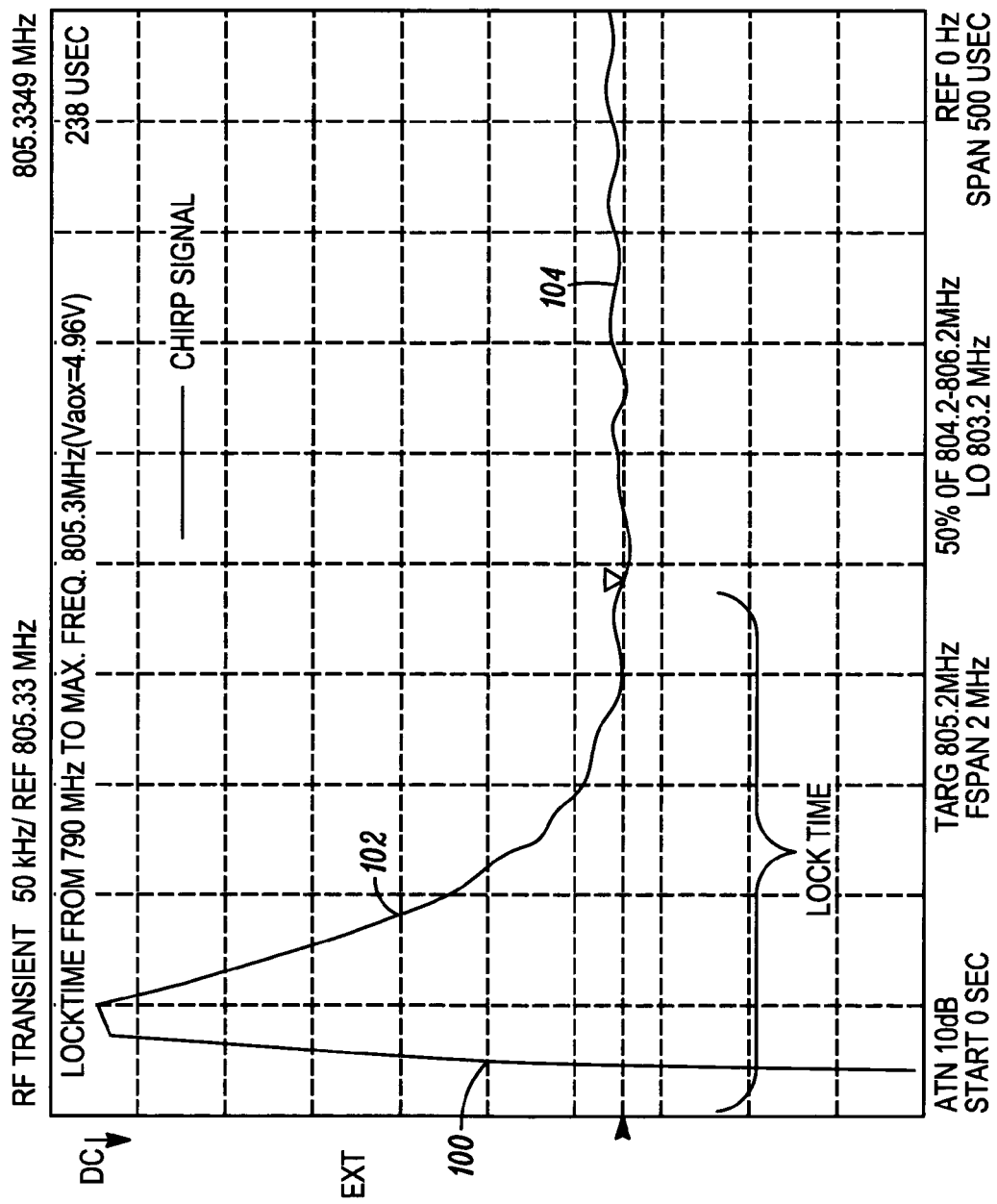
FIG. 6 depicts a time versus frequency graph that may be produced by the chirp generator of FIG. 5.

FIG. 6 illustrates a time-frequency response window of the synthesizer of FIG. 5 when it is programmed from the low to the high frequency operating limits. The low-end start time is below the equipment window, but is triggered at the same time as the counter, which accounts for the small gap between zero and the beginning of the signal displayed. A first portion 100 of the tracing is the chirp signal 24, a second portion 102 is a settling time and a final portion 104 is a narrow band operating region of the tracing.

In order to achieve the rapid frequency sweep response shown in FIG. 6, the main synthesizer (FIG. 5) may be programmed through a SPI interface for a constant High level charge pump current supplied from a dedicated 5 volt power source. The synthesizer loop filter is designed to have a wide bandwidth to support rapid frequency changes in both sweeping directions (+/−k in Eqn. 1.0 above). The time between sweeps (chirps) is mainly a function of the programming rate. Using a 32 bit programming word length and a standard 16.8 MHz reference clock (20 MHz max), allows one clock cycle for each programming interval and a the time of concatenated sub chirps to be on the order of 2 microseconds. In the up or down direction, full bandwidth signaling can occur at a rate in excess of 500 KHz depending on the type of coding used and its purpose.

It may be noticed that the FM sweep of FIG. 6 does not appear to be linear, as would otherwise be expected from Eqn. 1.0. This non-linearity has two effects, one beneficial and the other not beneficial. The least desired effect, albeit not totally destructive to the signal, is the assumption that the ramp is linear as suggested by the $kt^2/2$ term in Eqn. 1.0. The non-linearity produces a slight skew in the sidelobe levels, a broadening of the main compressed lobe, and filling in of some of the nulls. When used as a locating signal, this means that the resolution can degrade, but not as much as might be expected. For the purposes described herein and from what may be observed in FIG. 6, there may be up to a one to two meter error between radios.

The other effect of the non-linearity is actually a benefit. Because of the phase variation in the signal, a matched filter 32 can be developed that optimizes the energy compression and that can uniquely identify the transceiver 12 over other transceivers. Therefore a unique signature can be formed for each transceiver 12 based upon the specific phase variation and later used to identify that transceiver 12 based upon its unique signature. It has also been found possible to purposefully perform this task so that incoming signals can be more readily processed. This can be accomplished by replacing the $kt^2/2$ term in Eqn. 1.0 with a θ (t) function that can be measured during manufacture.

The frequency response of the FM chirp 24 may be described using the following equations.

$$\bar{\varepsilon}(f) = \sqrt{\frac{T}{2\Delta}} \, e^{-i\pi(f-f_o)^2/k} [Z(u_2) - Z(U_1)] \qquad 2.2$$

where $$Z(u) = C(u) - iS(u) = \int_0^u e^{i\pi\alpha^2/2} \, d\alpha,$$

$$u_2 = -2(f - f_o)\sqrt{\frac{T}{2\Delta}} + \sqrt{\frac{T\Delta}{2}}, \text{ and}$$

$$u_2 = -2(f - f_o)\sqrt{\frac{T}{2\Delta}} - \sqrt{\frac{T\Delta}{2}}.$$

If D (time-bandwidth product) is always greater than 100, then 98–99% of the energy of the chirp signal is confined between $f_o-\Delta/2$ and $f_o+\Delta/2$. From the information of FIG. 6, the D value is (15M*22 μs) or 330.

To encode information into the chirp signal 24, the synthesizer of FIG. 5 may be activated at different chirp frequencies and allowed to increase frequency until an upper limit is reached. Working backwards, the minimum time bandwidth product of 100 results in a start frequency of 794.5455 MHz as opposed to 790 MHz. Hence, discrete frequency starts from 790 to 795 MHz would yield code values that could be resolved by the receivers of the base stations 14, 16, 18.

In general, the locating system 10 may be used under any of a number of different modes. Under a first operating mode, a chirp function 36 within the transceiver 12 may periodically (e.g., every 10 ms) instruct the chirp generator 37 to send a chirp signal 24 to the base stations 14, 16, 18.

Base stations 14, 16, 18 may operate under a common time base provided by a time base controller 38. As each base station 14, 16, 18 receives the chirp signal 24, the base station 14, 16, 18 records a time of arrival at the base station 14, 16, 18. The base station 14, 16, 18 may also determine an identity of the transceiver 12 based upon the content, e.g. signature, of the chirp signal 24 saved in a memory 40.

The time of arrival and identity of the transceiver 12 may be transferred to a triangulation processor 34. Within the triangulation processor 34, the differences in time of arrival of the chirp signals 24 may be used to triangulate a location of the transceiver 12 within a building 11.

Alternatively, the time base controller 38 may periodically transmit a synchronization signal 28 to the transceiver 12. In response, the transceiver 12 may transmit one or more chirp signals 24.

In either of the above scenarios, a user of the transceiver 12 may continue to exchange voice and/or data with supervisory personnel or database at supervisory terminal 26 (e.g. via a transceiver function of the transceiver coupled to the chirp function) during transmission of the chirps 24. As such, the transceiver 12 may alternate transmission of narrowband signals and chirped signals. In this regard, the identification of location of the transceiver 12 would be completely transparent to the user of the transceiver 12.

In another embodiment of the invention, a control processor 42 within the supervisory terminal 26 may function to remotely turn the chirp function 36 on or off. For example, if a fireman were to become lost or lose consciousness within a burning building, then a supervisor working through the supervisor terminal 26 may activate the chirp function 36 by transmitting a control command 30 to the transceiver 12. Once activated, the chirp function 36 would periodically generate chirps 24 that would be detected by the base stations 14, 16, 18. Based upon the detected chirps 24, the triangulation processor 34 would determine a location of the transceiver 12.

In another embodiment of the invention, one or more of the base stations 14, 16, 18 may have a vertical directional capability. Such directional capability may be used to identify the floor in a multi-story building where the transceiver 12 is located.

Under another embodiment, a single mobile base station 14, 16, 18 may be used to simulate the activity of the three base stations 14, 16, 18. In this case, the mobile base station 14, 16, 18 may take measurements from a number of different positions surrounding the building 11 and triangulate the location of the transceiver 12 based upon those measurements. The single mobile base station 14, 16, 18 may, or may not, transmit a synchronization signal to further resolve location.

In the case of a mobile base station 14, 16, 18, the mobile base station may use GPS to determine the relative location of each reading by the base station before triangulating. In this way the mobile base station 14, 16, 18 could generate a map coordinate of the transceiver 12. However, if the mobile base station 14, 16, 18 were in a police car, the officer could simply enter a street address to provide the same information. Alternatively, the coordinates of the transceiver 12 may simply be a relative value from the signal measurement points.

A specific embodiment of radio frequency locating system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A radio system comprising:
a plurality of base stations and a radio narrowband transceiver, operating in any VHF, UHF and 700/800 MHz frequency bands;
the radio narrowband transceiver exchanging voice or data on a conventional narrowband channel of a plurality of conventional narrowband channels with a base station of the plurality of base stations, the radio narrowband transceiver having a voltage controlled oscillator generating a non-linear wideband chirp signal that non-linearly sweeps across the plurality of conventional narrowband channels, and transmitting the generated non-linear wideband chirp signal to all of the plurality of base stations; and
the plurality of base stations, each having a matched filter, receiving the non-linear wideband chirp signal from the radio narrowband transceiver, determining an identity of the radio narrowband transceiver based on a phase variation of the non-linear wideband chirp signal and triangulating a location of the identified radio narrowband transceiver using the received non-linear wideband chirp signal.

2. The radio system as in claim 1 further comprising a base station of the plurality of base stations transmitting a synchronization signal to the radio narrowband transceiver in order to synchronize transmission of the non-linear wideband chirp signal.

3. The radio system as in claim 1 further comprising a timing function within the radio narrowband transceiver that alternates transmission of narrowband signals and non-linear wideband chirp signals.

4. The radio system as in claim 1 wherein the non-linear wideband chirp signal further comprises a sweep time of less than 100 microseconds.

5. The radio system as in claim 1 wherein the non-linear wideband chirp signal further comprises a frequency range of greater than 10 MHz.

6. The radio system as in claim 1 further comprising a base station of the plurality of base stations remotely activating transmission of the non-linear wideband chirp signal.

7. The radio system as in claim 1 wherein some of the plurality of base stations are portable.

8. The radio system as in claim 1 wherein the same narrowband channel is used to exchange voice and data.

9. The radio system as in claim 1 wherein the conventional narrowband channel is not a spread-spectrum channel.

10. A radio narrowband transceiver comprising:
   a transceiver configured to operate in any VHF, UHF, and 700/800 MHz frequency band, to exchange voice or data with a base station of the plurality of base stations on a conventional narrowband channel of a plurality of conventional narrowband channels, and to periodically transmit a non-linear wideband chirp signal to all of a plurality of base stations, wherein the non-linear wideband chirp signal allows each of the plurality of base stations to determine an identity of the radio narrowband transceiver based on a phase variation of the non-linear wideband chirp signal and to triangulate a location of the radio narrowband transceiver; and
   a voltage controlled oscillator coupled to the transceiver and configured to generate the non-linear wideband chirp signal that non-linearly sweeps across the plurality of conventional narrowband channels.

11. The radio narrowband transceiver as in claim 10, wherein the transceiver is further configured to receive a synchronization signal from a base station of the plurality of base stations which the radio narrowband transceiver uses to synchronize transmission of the non-linear wideband chirp signal.

12. The radio narrowband transceiver as in claim 10 further comprising a timing function configured to alternate transmission of narrowband signals and non-linear wideband chirp signals.

13. The radio narrowband transceiver as in claim 10 wherein the conventional narrowband channel further comprises a FM channel.

14. The radio narrowband transceiver as in claim 10 wherein the non-linear wideband chirp signal further comprises a sweep time of less than 100 microseconds.

15. The radio narrowband transceiver as in claim 10 wherein the non-linear wideband chirp signal further comprises a frequency range of greater than 10 MHz.

16. The radio narrowband transceiver as in claim 10 wherein the same narrowband channel is used to exchange voice and data.

17. The radio narrowband transceiver as in claim 10 wherein the conventional narrowband channel is a not a spread-spectrum channel.

18. A radio system comprising:
   a radio narrowband transceiver configured to operate in any VHF, UHF and 700/800 MHz frequency bands, the radio narrowband transceiver, comprising:
      a transceiver configured to exchange voice or data with a base station of a plurality of base stations on a conventional narrowband channel of a plurality of conventional narrowband channels and to periodically transmit a non-linear wideband chirp signal to all of a plurality of base stations, and
      a voltage controlled oscillator coupled to the transceiver configured to generate the non-linear wideband chirp signal that non-linearly sweeps across the plurality of conventional narrowband channels; and
   the plurality of base stations, each including
      a matched filter configured to receive the non-linear wideband chirp signal transmitted by the radio narrowband transceiver and to determine an identity of the radio narrowband transceiver based on a phase variation of the non-linear wideband chirp signal,
      a timing function configured to measure a difference in time of arrival of the received non-linear wideband chirp signal received by the matched filter, and
      a triangulation processor configured to triangulate a location of the identified radio narrowband transceiver relative to the plurality of base stations based on the measured difference in the time of arrival of the received non-linear wideband chirp signal.

19. The radio system as in claim 18 wherein a base station of the plurality of base stations is further configured to transmit a synchronization signal to the radio narrowband transceiver in order to synchronize transmission of the non-linear wideband chirp signal.

20. The radio system as in claim 18 wherein the conventional narrowband channel further comprises a simplex channel.

21. The radio system as in claim 18 wherein the conventional narrowband channel further comprises a FM channel.

22. The radio system as in claim 18 wherein the non-linear wideband chirp signal further comprises a sweep time of less than 100 microseconds.

23. The radio system as in claim 18 wherein the non-linear wideband chirp signal further comprises a frequency range of greater than 10 MHz.

24. The radio system as in claim 18 wherein the same narrowband channel is used to exchange voice and data.

25. The radio system as in claim 18 wherein the conventional narrowband channel is a not a spread-spectrum channel.

26. A base station in a radio system, the base station comprising:
   a matched filter configured to receive a non-linear wideband chirp signal transmitted by a radio narrowband transceiver and to determine an identity of the radio narrowband transceiver based on a phase variation of the non-linear wideband chirp signal, wherein the non-linear wideband chirp signal non-linearly sweeps across all of a plurality of conventional narrowband channels;
   a timing function configured to measure a difference in time of arrival of the received non-linear wideband chirp signal received by the matched filter; and
   a triangulation processor configured to triangulate a location of the identified radio narrowband transceiver relative to a plurality of base stations based on the measured difference in the time of arrival of the received non-linear wideband chirp signal.

* * * * *